(12) United States Patent
Peter

(10) Patent No.: US 11,942,111 B2
(45) Date of Patent: Mar. 26, 2024

(54) DATA STORAGE DEVICE AND METHOD FOR AUTO-PEELING OF SURVEILLANCE VIDEO CONTENT TO INCREASE ARCHIVAL STORAGE

(71) Applicant: Western Digital Technologies, Inc., San Jose, CA (US)

(72) Inventor: Eldhose Peter, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 226 days.

(21) Appl. No.: 17/348,148

(22) Filed: Jun. 15, 2021

(65) Prior Publication Data
US 2022/0399040 A1    Dec. 15, 2022

(51) Int. Cl.
G11B 20/00     (2006.01)
G06F 12/10     (2016.01)
H04N 7/01      (2006.01)
H04N 19/426    (2014.01)

(52) U.S. Cl.
CPC ........ *G11B 20/00007* (2013.01); *G06F 12/10* (2013.01); *H04N 7/013* (2013.01); *H04N 19/428* (2014.11); *G06F 2212/1044* (2013.01); *G11B 2020/00072* (2013.01)

(58) Field of Classification Search
CPC .... G11B 20/00007; G11B 2020/00072; H04N 19/428; H04N 7/013; G06F 12/10; G06F 2212/1044
See application file for complete search history.

(56) References Cited

U.S. PATENT DOCUMENTS

| | | | |
|---|---|---|---|
| 6,782,052 B2 | 8/2004 | Sun et al. | |
| 8,351,514 B2 | 1/2013 | Narasimhan et al. | |
| 8,848,787 B2 | 9/2014 | Karczewicz et al. | |
| 2004/0101272 A1* | 5/2004 | Boston | H04N 5/76 386/295 |
| 2006/0133775 A1* | 6/2006 | Ju | H04N 21/4334 386/323 |
| 2007/0112826 A1* | 5/2007 | Laksono | G11B 20/00007 707/999.102 |
| 2009/0196345 A1* | 8/2009 | Nair | G11B 20/1262 375/240.02 |
| 2013/0188743 A1 | 7/2013 | Chen | |

(Continued)

OTHER PUBLICATIONS

International Search Report dated May 1, 2022 for International Application No. PCT/US2022/012860.

(Continued)

*Primary Examiner* — Sunghyoun Park
(74) *Attorney, Agent, or Firm* — Crowell & Moring LLP

(57) ABSTRACT

A data storage device and method for auto-peeling of surveillance video content to increase archival storage is provided. In one embodiment, a data storage device is provided comprising a memory and a controller. The controller is configured to determine that available storage space in the memory is less than a threshold; in response to determining that the available storage space in the memory is less than the threshold: read a video file from the memory; and re-encode the video file to decrease a size of the video file, wherein re-encoding the video file increases available storage space in the memory without deleting the video file. Other embodiments are provided.

19 Claims, 7 Drawing Sheets

(56) References Cited

U.S. PATENT DOCUMENTS

| | | | | |
|---|---|---|---|---|
| 2014/0208007 A1* | 7/2014 | Cohen | .................... | G06F 3/0619 |
| | | | | 711/103 |
| 2017/0142417 A1* | 5/2017 | Deen | ..................... | H04L 65/613 |
| 2018/0341706 A1* | 11/2018 | Agrawal | .................. | G06F 16/73 |
| 2019/0149793 A1* | 5/2019 | Huang | ..................... | H04N 9/79 |
| | | | | 386/232 |
| 2021/0294752 A1* | 9/2021 | Palmer | ................ | G06F 12/0292 |

OTHER PUBLICATIONS

Written Opinion dated May 1, 2022 for International Application No. PCT/US2022/012860.

\* cited by examiner

| NTSC: Recording Variable: 10fps | | Surveillance Hard Drive Capacity | | | | | |
|---|---|---|---|---|---|---|---|
| | | 1TB | 2TB | 3TB | 4TB | 5TB | 6TB |
| 176 x 120 | # Days | 694 | 1388 | 2082 | 2776 | 3470 | 4164 |
| 352 x 240 | # Days | 266 | 532 | 798 | 1064 | 1330 | 1596 |
| 704 x 480 | # Days | 86 | 172 | 258 | 344 | 430 | 516 |
| 1280 x 1024 | # Days | 26 | 52 | 78 | 104 | 130 | 156 |

| NTSC: Recording Variable: 20fps | | Surveillance Hard Drive Capacity | | | | | |
|---|---|---|---|---|---|---|---|
| | | 1TB | 2TB | 3TB | 4TB | 5TB | 6TB |
| 176 x 120 | # Days | 346 | 692 | 1038 | 1384 | 1730 | 2076 |
| 352 x 240 | # Days | 132 | 264 | 396 | 528 | 660 | 792 |
| 704 x 480 | # Days | 42 | 84 | 126 | 168 | 210 | 252 |
| 1280 x 1024 | # Days | 12 | 24 | 36 | 48 | 60 | 72 |

| NTSC: Recording Variable: 30fps | | Surveillance Hard Drive Capacity | | | | | |
|---|---|---|---|---|---|---|---|
| | | 1TB | 2TB | 3TB | 4TB | 5TB | 6TB |
| 176 x 120 | # Days | 230 | 460 | 690 | 920 | 1150 | 1380 |
| 352 x 240 | # Days | 88 | 176 | 264 | 352 | 440 | 528 |
| 704 x 480 | # Days | 28 | 56 | 84 | 112 | 140 | 168 |
| 1280 x 1024 | # Days | 8 | 16 | 24 | 32 | 40 | 48 |

FIG. 4

DATA STORAGE DEVICE AND METHOD FOR AUTO-PEELING OF SURVEILLANCE VIDEO CONTENT TO INCREASE ARCHIVAL STORAGE

BACKGROUND

In video surveillance systems, digital video captured by a camera is sometimes stored in a loop in memory, where the oldest previously-written video is erased to make room to store a new video. In this way, the memory (sometimes referred to as a circular memory) is like a first-in-first-out (FIFO) queue, where new video data is continuously written at one end of the memory, and, once the memory reaches its capacity limit, the oldest-written video data is deleted to make space for new, incoming video data.

BRIEF DESCRIPTION OF THE DRAWINGS

FIG. 4 is a video surveillance storage matrix of an embodiment.

DETAILED DESCRIPTION

Overview

Figure 1A:
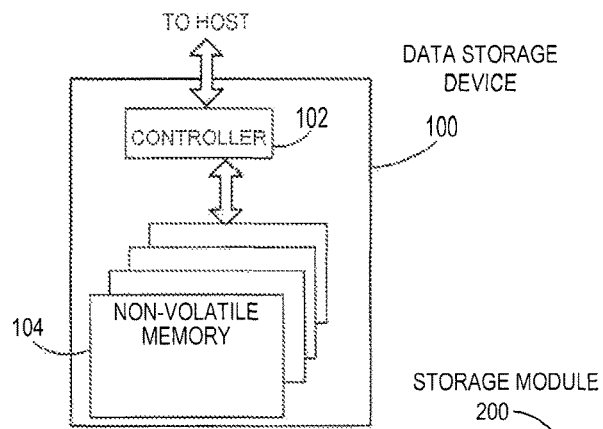
FIG. 1A is a block diagram of a data storage device of an embodiment.

By way of introduction, the below embodiments relate to a data storage device and method for auto-peeling of surveillance video content to increase archival storage. In one embodiment, a data storage device is provided comprising a memory and a controller. The controller is configured to determine that available storage space in the memory is less than a threshold; in response to determining that the available storage space in the memory is less than the threshold: read a video file from the memory; and re-encode the video file to decrease a size of the video file, wherein re-encoding the video file increases available storage space in the memory without deleting the video file.

In some embodiments, the size of the video file is decreased by lowering the resolution of the video file.

In some embodiments, the size of the video file is decreased by lowering a bit rate of the video file.

In some embodiments, the size of the video file is decreased by removing video frames from the video file.

In some embodiments, the controller is further configured to select the video file to re-encode based on how long the video file was stored in the memory.

In some embodiments, the video file was stored in the memory for a longer length of time than another video file.

In some embodiments, the controller is further configured to update a logical-to-physical address map to reflect the re-encoded video file.

In some embodiments, a portion of the memory is allocated for storage of video files.

In some embodiments, the controller comprises an audio/video encoder/decoder configured to re-encode the video file.

In some embodiments, the video file comprises a surveillance video.

In some embodiments, the memory comprises a three-dimensional memory.

In another embodiment, a method is provided that is performed in a data storage device comprising a memory. The method comprises: determining that available storage capacity in a portion of the memory allocated for storage of video files needs to be increased; selecting a video file stored in the portion of the memory; and re-encoding the video file to decrease a size of the video file to increase available storage capacity in the portion of the memory without deleting the video file.

In some embodiments, re-encoding comprises lowering the resolution of the video file.

In some embodiments, re-encoding comprises lowering a bit rate of the video file.

In some embodiments, re-encoding comprises removing video frames from the video file.

In some embodiments, the video file is selected based on how long the video file was stored in the portion of the memory.

In some embodiments, the video file was stored in the portion of the memory for a longer length of time than another video file.

In some embodiments, the method further comprises updating a logical-to-physical address map to reflect the re-encoding.

In some embodiments, the video file comprises a surveillance video.

In another embodiment, a data storage device is provided comprising: a memory; means for determining that available storage space in the memory is less than a threshold; means for reading a video file from the memory; and means for re-encoding the video file to decrease a size of the video file.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
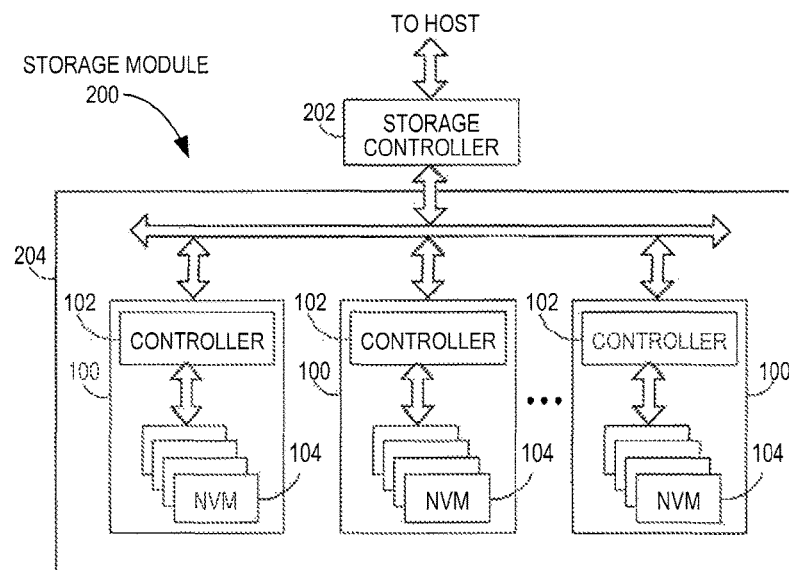
FIG. 1B is a block diagram illustrating a storage module of an embodiment.
Figure 1C:
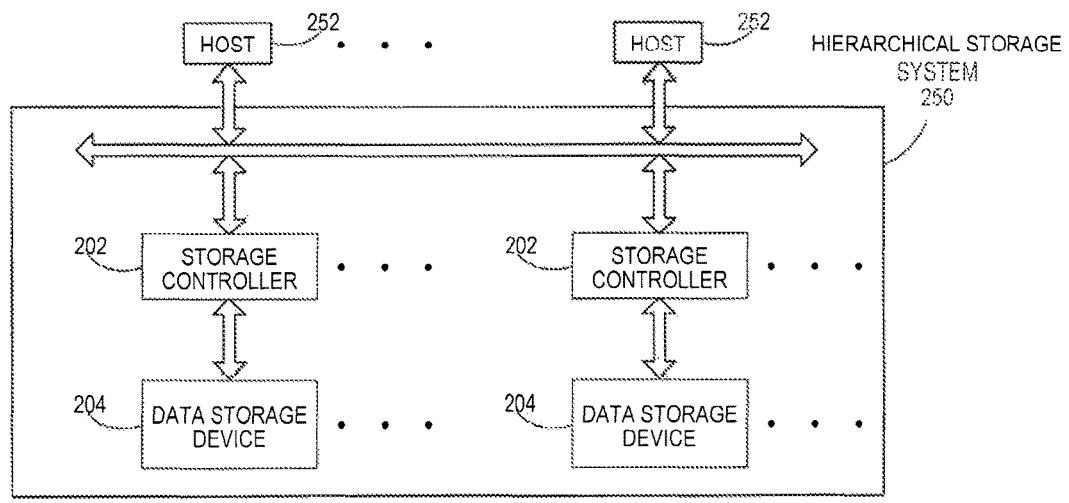
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
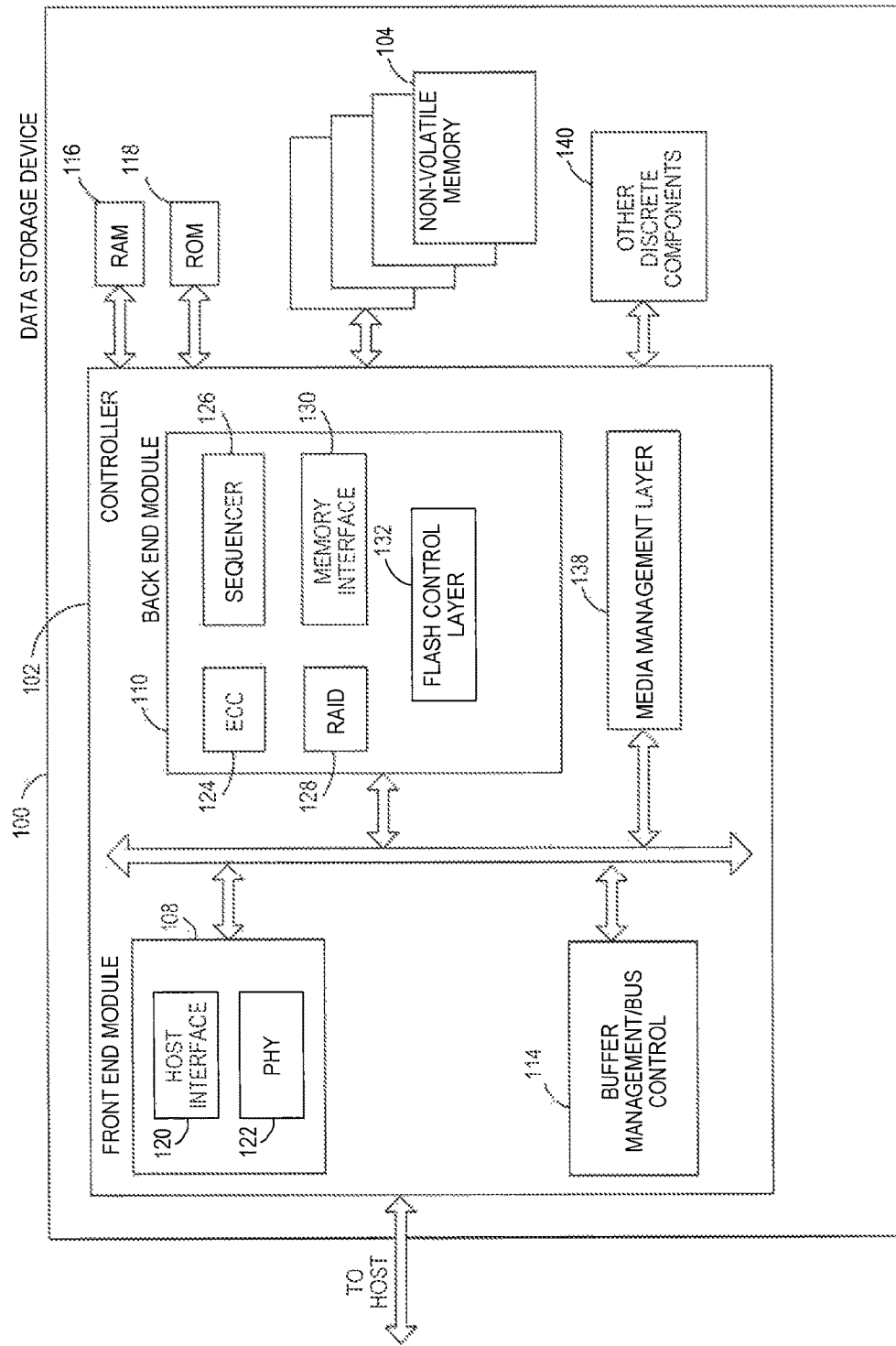
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
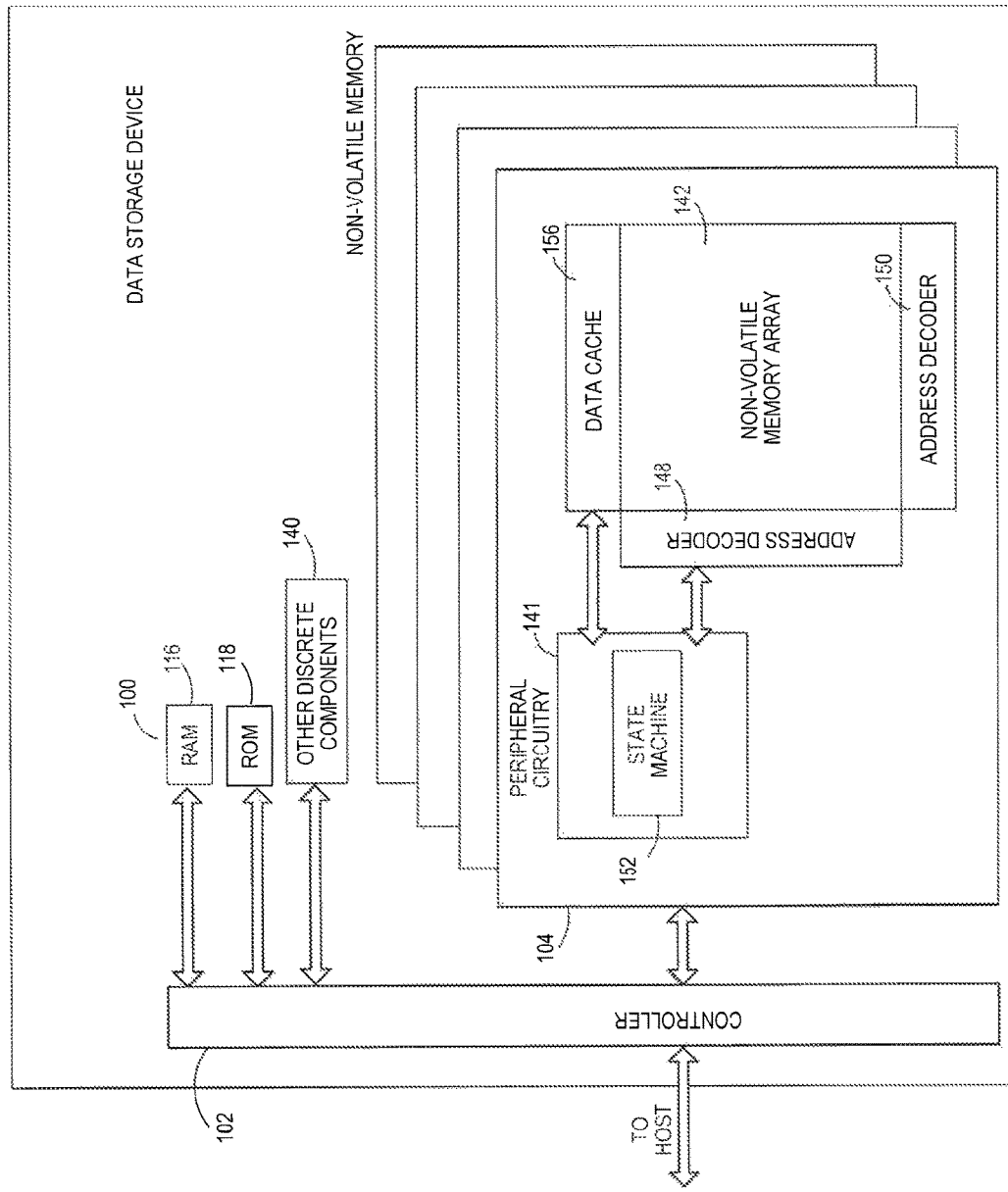
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
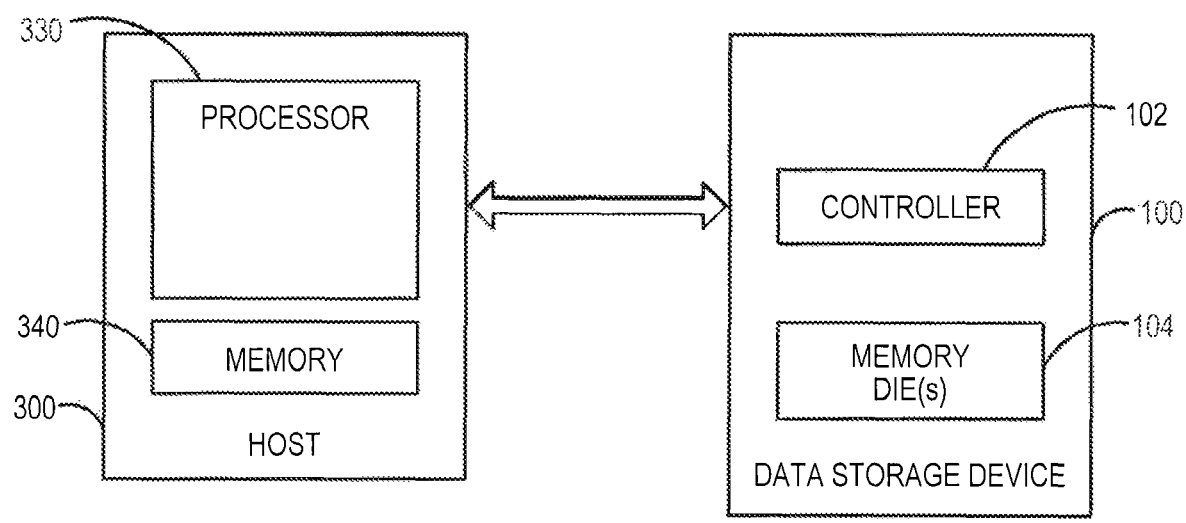
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, in video surveillance systems, digital video captured by a camera is sometimes stored in a loop in memory, where the oldest previously-written video is erased to make room to store a new video. The captured data is stored in sequential files. Once the allocated storage is full, the data storage device overwrites the old data with new recorded data in a loop recording. Thus, the amount of archival storage is limited by the amount of storage available. This can be problematic, especially when video is recorded in high-definition quality, which limits the amount of archival storage.

While there are available techniques to increase archival storage at the time of recording, most of these techniques affect the quality of the recoded data. However, the quality of recorded data may be vital at the time of playback for any analysis on the recorded data. To deliver required performance and efficiency in each security environment, a video surveillance system may be required to have enough storage capacity to address three fundamental video parameters. quantity (the number and time duration of the video streams), quality (the image quality of the video streams, expressed in terms of frame resolution (e.g., 1280×1024 pixels) and frames per second (fps)), and archiving (the length of time the video streams will be stored in the memory of the data storage device). FIG. 4 is a diagram of a video surveillance storage matrix for Moving Picture Experts Group (MPEG)-4 encoding that illustrates the inter-relationship among these factors.

As noted above, when the portion of the memory 104 that stores video files is full or is getting full, the oldest stored video file can be deleted to make room for a new video file. It is possible that the deleted video file will be needed for review in the future. However, once the video file is deleted, that is not possible. To address this situation, the following embodiments can create free space in the memory 104 without deleting the file. More particularly, in these embodiments, instead of deleting the video file, the controller 102 of the data storage device 100 can re-encode the video file to reduce its size (this process is sometimes referred to herein as "peeling" or "auto-peeling"). This creates free space in the memory 104 for storage of a new video file without deleting the old video file. That is, instead of overwriting old recorded footage with a new one, these embodiments peel off the old recorded footage (e.g., when the allocated storage space in the memory 104 is nearing fullness) to increase the archival storage space. Because the old video file is still stored in the memory 104, it can still be viewed, albeit at a lower quality.

It should be noted that, with these embodiments, the initially quality of the recorded video is not necessarily decreased, as the decrease in quality comes later when the video file is auto-peeled. So, at the time of recording, the quality of the recorded data can be maintained to its maximum quality, if desired. As the age of the footage increases, the controller 102 of the data storage device 100 can internally decode it and again re-encode it to a lower resolution or a lower bit rate to reduce the storage space of the footage, thus increasing the archival storage within the available storage space in the memory 104. In the surveillance system, the importance of recorded footage may reduce with time. For example, data recorded in the last three-to-four days may be more relevant than data recorded more than twenty days ago.

The following paragraphs provide example implementations of these embodiments. It should be understood that these are merely examples and other implementations can be used.

Figure 5:
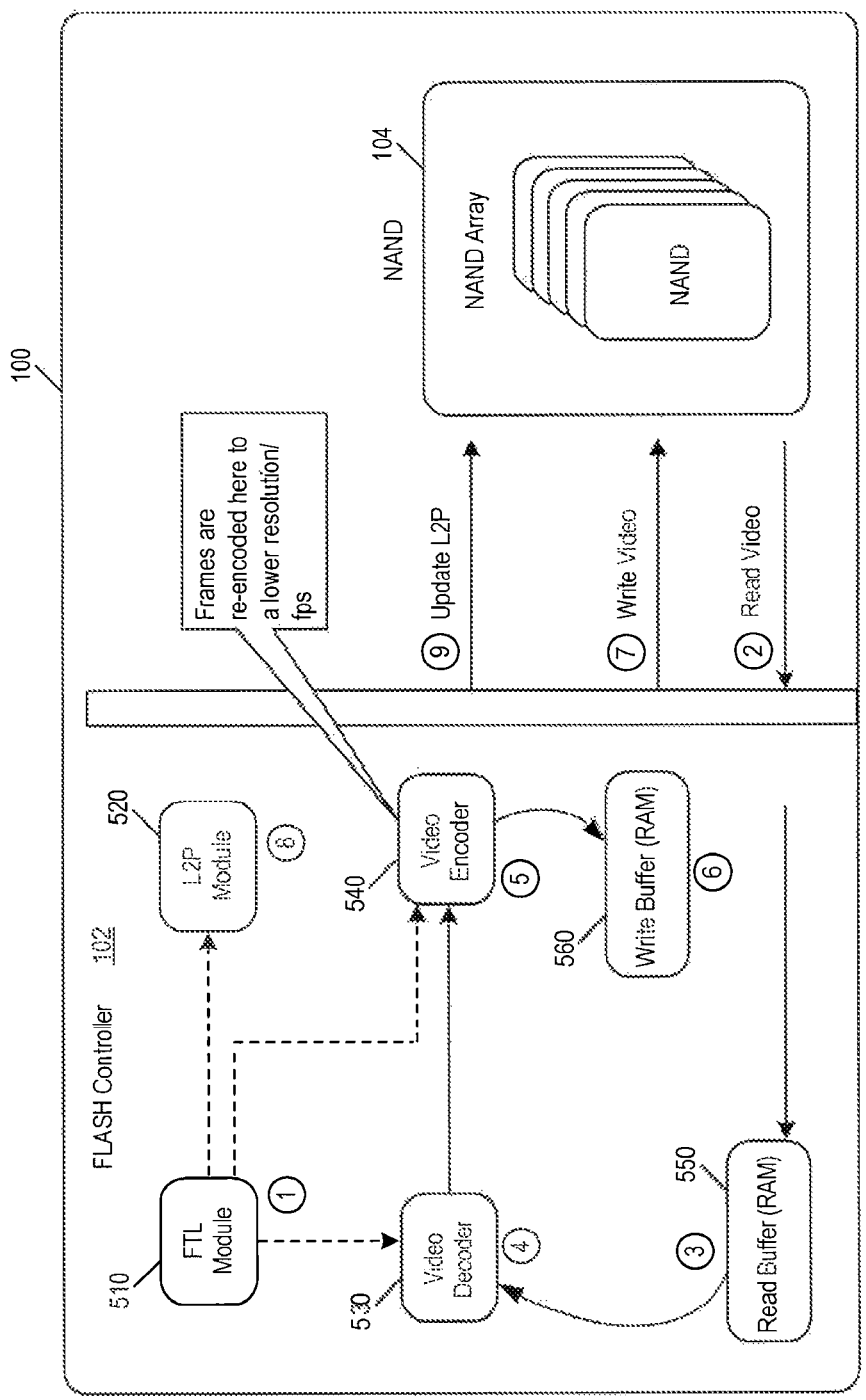
FIG. 5 is an illustration of a data storage device of an embodiment.

Turning again to the drawings, FIG. 5 is an example of a data storage device 100 that can be used with these embodiments. As shown in FIG. 5, in this example, the controller 102 comprises a flash translation layer (FTL) module 510, a logical-to-physical (L2P) address mapping module 520, a video decoder 530, a video encoder 540, a read buffer 550, and a write buffer 560. Also, in this example, the memory 104 comprises a plurality of memory dies, and a portion of the memory 104 is allocated for storage of video files.

In this example, the controller 102 monitors the memory 104 to determine whether available storage space in the memory 104 is less than a threshold. The controller 102 can use any suitable mechanism to determine whether available storage capacity in the memory 104 is less than the threshold and needs to be increased. For example, in the implementation shown in FIG. 5, the FTL module 510 in the controller 102 periodically checks to see whether the remaining space is nearing the fullness of the allocated storage capacity (act 1). If the remaining space is less than the threshold, the controller 102 starts peeling off one of video files stored in the memory 104. To do this, the controller 102 can read a video file from the memory 104 (act 2), store it in the read buffer (act 3), decode the video file with the video decoder 530 (act 4), re-encode the video file with the video encoder 540 in a way that reduces the size of the video file (act 5), write the re-encoded video file in the write buffer 560 (act 6), and then write the re-encoded video file back to the memory 104 (act 7). The L2P module 520 can then update a logical-to-physical address map stored in the memory 104 to reflect the re-encoded video file (acts 8 and 9).

The controller 102 can chose the video file to re-encode in any suitable way. For example, the controller 102 can select the video file to auto-peel based on how long the video file was stored in the memory 104. In this way, a video file stored in the memory 104 for a longer length of time (e.g., the oldest video file) can be selected for auto-peeling before another video file. Factors other than or in addition to age of the video file can be used in the selection. Also, the controller 102 can re-encode the selected video file in any suitable way to reduce its size. For example, the controller 102 can lower the resolution of the video file, lower a bit rate of the video file, and/or remove video frames from the video file.

Figure 6:
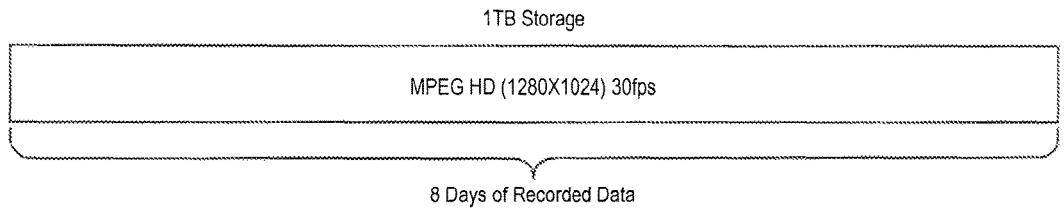
FIG. 6 is an illustration of storage capacity of a memory of an embodiment.

Turning again to the drawings, FIGS. 6-10 illustrate how these embodiments can increase archival storage in the memory 104. In this example, a high-definition video is captured with 30 fps in one terabyte (TB) of storage space in the memory 104. As per the matrix in FIG. 4, in a traditional data storage device, high-definition (HD) quality video (1280×1024) with 30 fps of recorded content in one TB of storage space can only be stored for eight days (FIG. 6). After that, the loop recording mechanism will start overwriting the old content.

Figure 7:
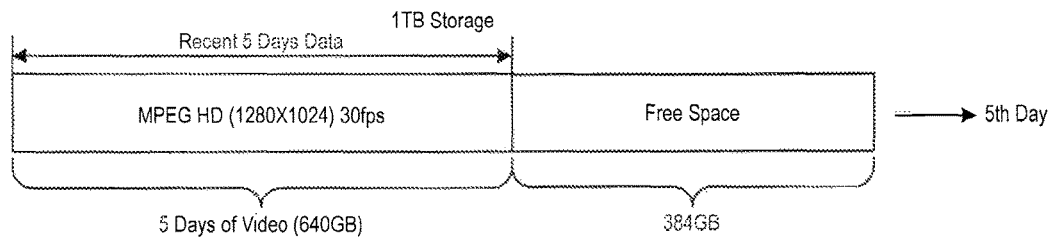
FIG. 7 is an illustration of storage capacity of a memory of an embodiment with auto-peeling of past recorded content after five days.
Figure 8:
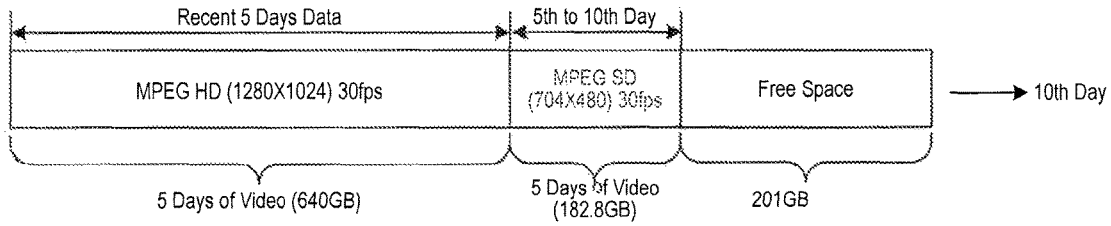
FIG. 8 is an illustration of storage capacity of a memory of an embodiment with auto-peeling of past recorded content after ten days.
Figure 9:
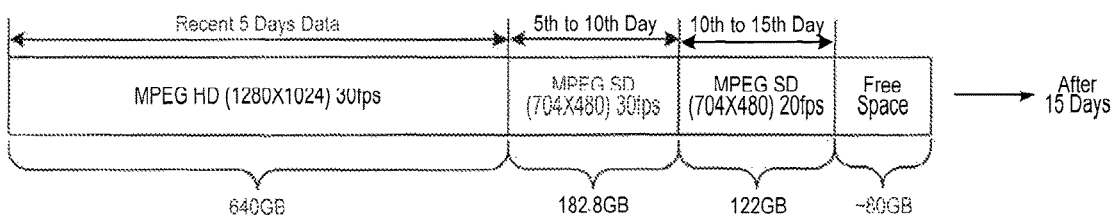
FIG. 9 is an illustration of storage capacity of a memory of an embodiment with auto-peeling of past recorded content after fifteen days.

In a traditional data storage device, in five days, the device will consume 640 gigabytes (GB) of storage space while capturing HD quality (1280×1024), 30 fps content, and the free space will be 384 GB. With these embodiments, the controller 102 will perform auto-peeling of past recorded content to avoid deleting a video file. So, the next day onwards, the controller 102 can start peeling off the old content to reduce the storage requirement (FIG. 7).

Figure 10:
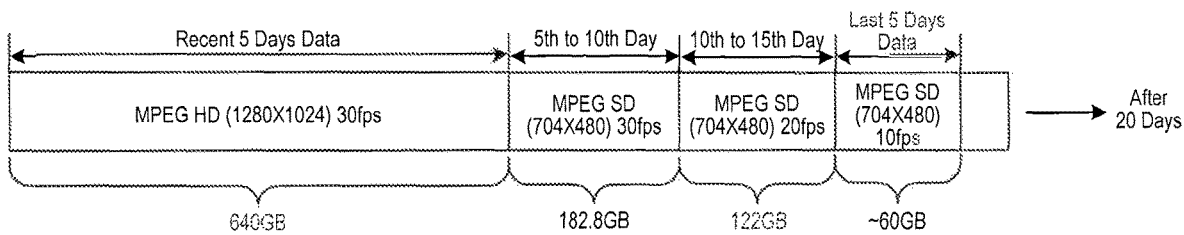
FIG. 10 is an illustration of storage capacity of a memory of an embodiment with auto-peeling of past recorded content after twenty days.

After 10 days (FIG. 8), the controller 102 can strip data to a lower resolution (e.g., standard definition (SD) quality) with the same 30 fps. This will help reduce the storage requirement for the first five days data from 640 GB to ~182 GB. The recent five days of data are still captured in HD quality. Similarly, after 15 days (FIG. 9), the first five days of data ($10^{th}$ to $15^{th}$ day) can be further peeled off to a lower 20 fps with the same SD quality. This will help in reducing the first five days of data storage required to 122 GB from 182 GB. As described above, the $5^{th}$ to $10^{th}$ days of data are reduced to SD quality, and the recent five days of data will still be stored in HD quality. As shown in FIG. 10, the data that is recorded in the initial five days can be further peeled off to a lower 10 fps with the same SD quality. This will help in reducing the first five days data of storage required to just 60 GB from 122 GB.

So, in this example, instead of just storing eight days of HD quality data, these embodiment can be used to provide five days of the same HD quality data along with five days of SD quality data with 30 fps and another five days of content with SD quality with 20 fps and another five days of data with SD quality with 10 fps. So, the video file is stored for a total of 20 days instead of 8 days.

There are many advantages associated with these embodiments. For example, by peeling off aged video data to a lower quality instead of overwriting it with recent data, there embodiments can increase the archival storage without compromising the initial recording quality. This allows the aged video to be viewable while continuing to peel off the video to a series of relevant images.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller configured to:
   receive first video data;
   store the first video data in the memory at a first quality level;
   after expiration of a first time period:
     read the first video data from the memory;
     re-encode the first video data at a second quality level, wherein the second quality level is lower than the first quality level; and
     store the first video data re-encoded at the second quality level in the memory;
   receive second video data;
   store the second video data in the memory at the first quality level; and
   after expiration of a second time period:
     read the first video data from the memory;
     re-encode the first video data at a third quality level, wherein the third quality level is lower than the second quality level;
     store the first video data re-encoded at the third quality level in the memory;
     read the second video data from the memory;
     re-encode the second video data at the second quality level; and
     store the second video data re-encoded at the second quality level in the memory.

2. The data storage device of claim 1, wherein the second quality level is lower than the first quality level in terms of resolution.

3. The data storage device of claim 1, wherein the second quality level is lower than the first quality level in terms of bit rate.

4. The data storage device of claim 1, wherein the second quality level is lower than the first quality level in terms of number of video frames.

5. The data storage device of claim 1, wherein the controller is further configured to update a logical-to-physical address map to indicate the re-encoded first video data.

6. The data storage device of claim 1, wherein a portion of the memory is allocated for storage of video data.

7. The data storage device of claim 1, wherein the controller comprises an audio/video encoder/decoder configured to re-encode the first video data.

8. The data storage device of claim 1, wherein the first video data comprises a surveillance video.

9. The data storage device of claim 1, wherein the memory comprises a three-dimensional memory.

10. The method of claim 9, wherein the first video file comprises a surveillance video.

11. A method comprising:
    performing the following in a data storage device comprising a memory:
    receiving a first video file;
    storing the first video file in the memory at a first quality level;
    after expiration of a first time period:
      reading the first video file from the memory;
      re-encoding the first video file at a second quality level, wherein the second quality level is lower than the first quality level; and
      storing the first video file re-encoded at the second quality level in the memory;
    receiving a second video file;
    storing the second video file in the memory at the first quality level; and
    after expiration of a second time period:
      reading the first video file from the memory;
      re-encoding the first video file at a third quality level, wherein the third quality level is lower than the second quality level;
      storing the first video file re-encoded at the third quality level in the memory;
      reading the second video file from the memory;
      re-encoding the second video file at the second quality level; and
      storing the second video file re-encoded at the second quality level in the memory.

12. The method of claim 11, wherein the second quality level is lower than the first quality level in terms of resolution.

13. The method of claim 11, wherein the second quality level is lower than the first quality level in terms of bit rate.

14. The method of claim 11, wherein the second quality level is lower than the first quality level in terms of number of video frames.

15. The method of claim 11, further comprising updating a logical-to-physical address map to indicate the re-encoding the first video file.

16. The method of claim 11, wherein a portion of the memory is allocated for storage of video files.

17. The method of claim 11, wherein the first video file is re-encoded using an audio/video encoder/decoder in the data storage device.

18. The method of claim 11, wherein the memory comprises a three-dimensional memory.

19. A data storage device comprising:
    a memory;
    means for receiving a first video file;
    means for storing the first video file in the memory at a first quality level;
    means for performing after expiration of a first time period:
      reading the first video file from the memory;
      re-encoding the first video file at a second quality level, wherein the second quality level is lower than the first quality level; and
      storing the first video file re-encoded at the second quality level in the memory;
    means for receiving a second video file;
    means for storing the second video file in the memory at the first quality level; and
    means for performing after expiration of a second time period:
      reading the first video file from the memory;
      re-encoding the first video file at a third quality level, wherein the third quality level is lower than the second quality level;
      storing the first video file re-encoded at the third quality level in the memory;
      reading the second video file from the memory;
      re-encoding the second video file at the second quality level; and
      storing the second video file re-encoded at the second quality level in the memory.

* * * * *